(12) United States Patent
Wasilewski et al.

(10) Patent No.: US 9,651,212 B1
(45) Date of Patent: May 16, 2017

(54) LIGHT ASSEMBLY

(71) Applicant: GM GLOBAL TECHNOLOGY OPERATIONS LLC, Detroit, MI (US)

(72) Inventors: Andrzej Wasilewski, Shelby Township, MI (US); Richard Tepper, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/977,980

(22) Filed: Dec. 22, 2015

(51) Int. Cl.
  *F21V 9/00* (2015.01)
  *B62J 6/00* (2006.01)
  *F21V 33/00* (2006.01)
  *F21S 8/10* (2006.01)

(52) U.S. Cl.
  CPC ......... *F21S 48/1241* (2013.01); *F21S 48/115* (2013.01); *F21S 48/1747* (2013.01)

(58) Field of Classification Search
  CPC ... F21S 48/1241; F21S 48/1747; F21S 48/115
  See application file for complete search history.

(56) References Cited

U.S. PATENT DOCUMENTS

2016/0320010 A1\* 11/2016 Weiss .................. B60Q 1/0058

\* cited by examiner

*Primary Examiner* — Donald Raleigh
(74) *Attorney, Agent, or Firm* — Quinn IP Law

(57) ABSTRACT

The present disclosure provides a light assembly including a housing and a lens secured to the housing. The lens cooperates with the housing to define an interior region therebetween. The light assembly also includes a first light module disposed in the interior region. The first light module is selectively operable to emit light that is transmitted through the lens. The light assembly further includes a second light module selectively operable to emit light that is transmitted through the lens. At least a portion of the second light module is integrated into the lens.

20 Claims, 3 Drawing Sheets

LIGHT ASSEMBLY

TECHNICAL FIELD

The present disclosure relates to a light assembly.

BACKGROUND

Vehicles generally utilize a headlight to light an area. Generally, headlights are utilized at night to increase visibility but some headlights utilize lights during the day, which can be referred to as daylights. The headlights and daylights can emit light that is transmitted through an outer lens. The outer lens protects the headlights and daylights from fluid, debris, etc. Generally, the daylights are housed in a space behind the outer lens such that the daylights are spaced from the outer lens.

SUMMARY

The present disclosure provides a light assembly including a housing and a lens secured to the housing. The lens cooperates with the housing to define an interior region therebetween. The light assembly also includes a first light module disposed in the interior region. The first light module is selectively operable to emit light that is transmitted through the lens. The light assembly further includes a second light module selectively operable to emit light that is transmitted through the lens. At least a portion of the second light module is integrated into the lens.

The present disclosure also provides another light assembly that includes a housing and a lens secured to the housing. The lens cooperates with the housing to define an interior region therebetween. The light assembly also includes a first light module disposed in the interior region and selectively operable to emit light that is transmitted through the lens. The light assembly further includes a second light module selectively operable to emit light that is transmitted through the lens. The second light module includes a first portion integrated into the lens and configured to transmit light therethrough. The first portion extends outwardly from the lens away from the interior region such that the first portion is disposed outside of the interior region. The second light module further includes a second portion integrated into the lens and configured to transmit light therethrough. The second portion extends outwardly from the lens away from the first portion such that the second portion is disposed inside of the interior region.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Referring to the Figures, wherein like numerals indicate like or corresponding parts throughout the several views, a light assembly 10 is generally shown in FIGS. 1-4.

Figure 1:
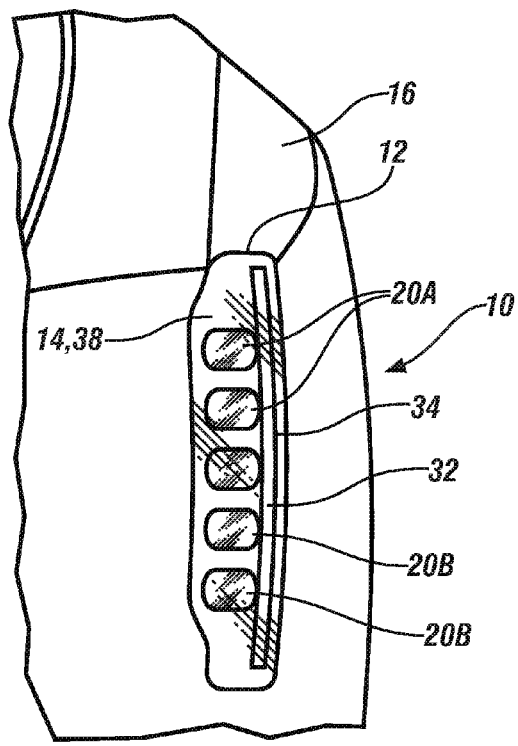
FIG. 1 is a schematic fragmentary front view of a light assembly configured to cooperate with a vehicle.
Figure 2:
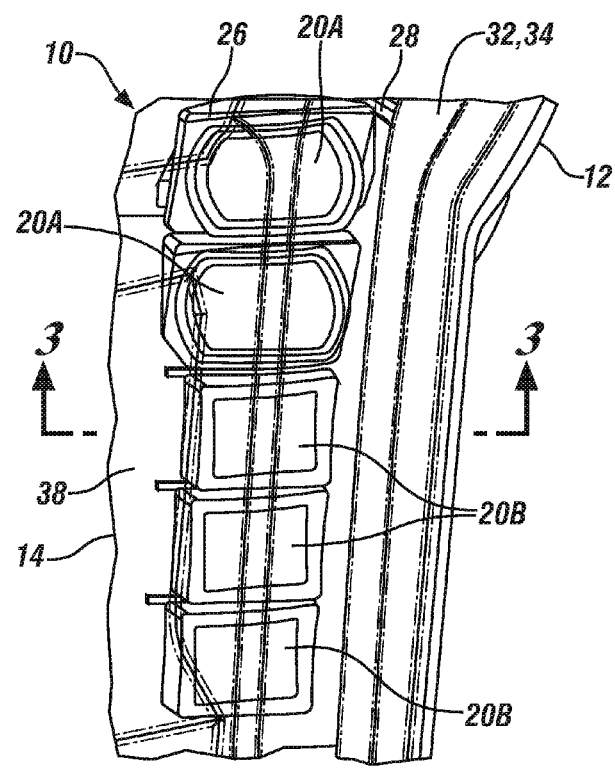
FIG. 2 is a schematic fragmentary perspective view of the light assembly.
Figure 3:
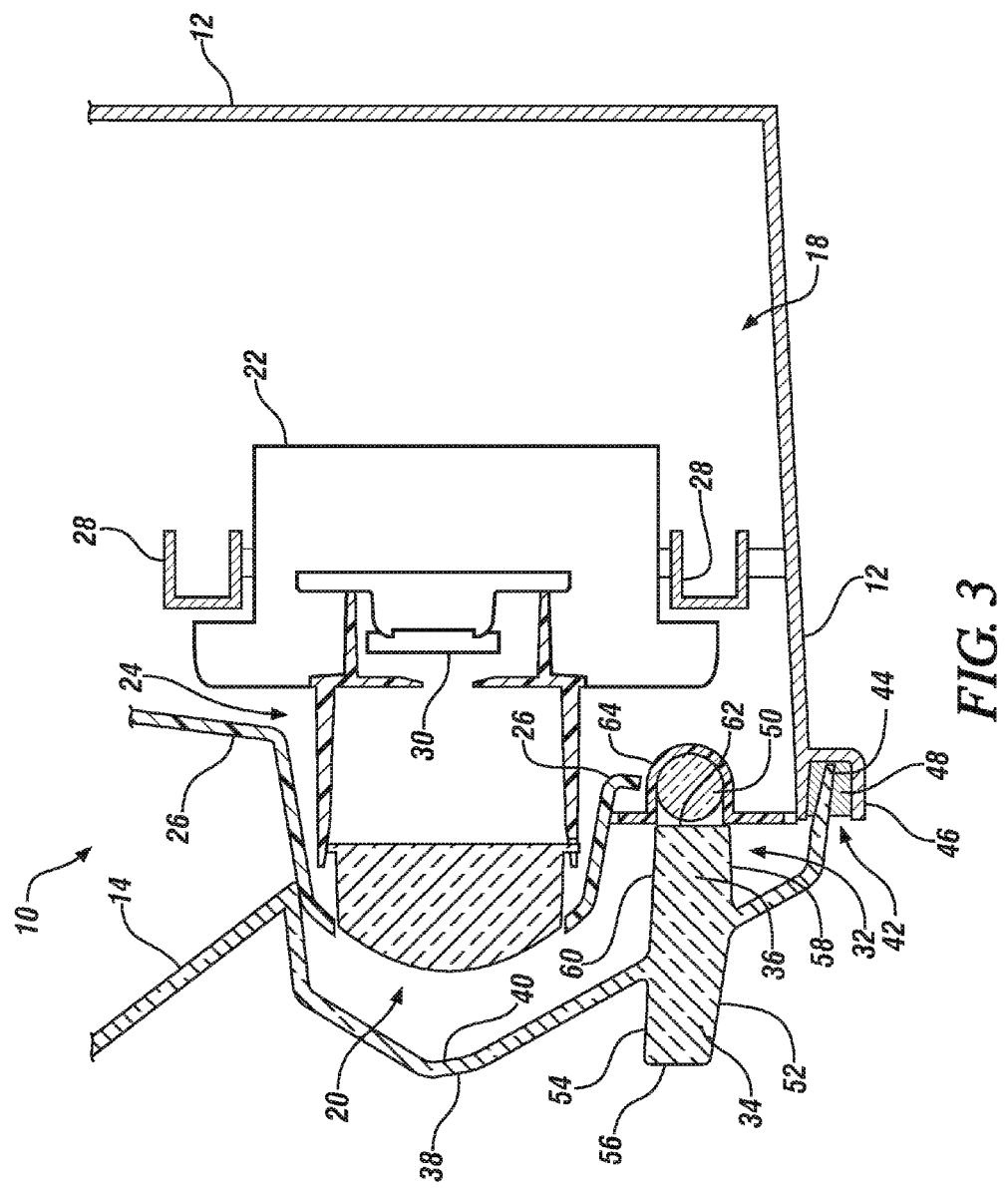
FIG. 3 is a schematic cross-sectional view of the light assembly taken from lines 3-3 of FIG. 2.

As best shown in FIGS. 2 and 3, the light assembly 10 includes a housing 12 and a lens 14 secured to the housing 12. The housing 12 can be attached to another structure 16. For example, the housing 12 can be configured for attachment to a structure 16 of a vehicle (see FIG. 1). The housing 12 can be any suitable configuration and can include one or more pieces.

The light assembly 10 can be utilized in a vehicle application or non-vehicle application. Non-limiting examples of vehicles can include cars, trucks, motorcycles, boats, watercrafts, all-terrain vehicles, off-road vehicles, aircrafts, farm equipment or any other suitable vehicle. Non-limiting examples of non-vehicles can include machines, billboard signs, spotlights, farm equipment or any other suitable non-vehicle.

Turning to FIG. 3, the lens 14 cooperates with the housing 12 to define an interior region 18 therebetween. More specifically, the lens 14 can be attached to and supported by the housing 12. The lens 14 can be any suitable configuration and can include one or more pieces. Generally, the lens 14 can be manufactured from transparent material(s), such as but not limited to, a polycarbonate material. The lens 14 provides a front cover for the components of the light assembly 10, which prevents fluid and/or debris, etc. from entering the interior region 18. The lens 14 is configured to allow the light to pass therethrough.

Figure 4:
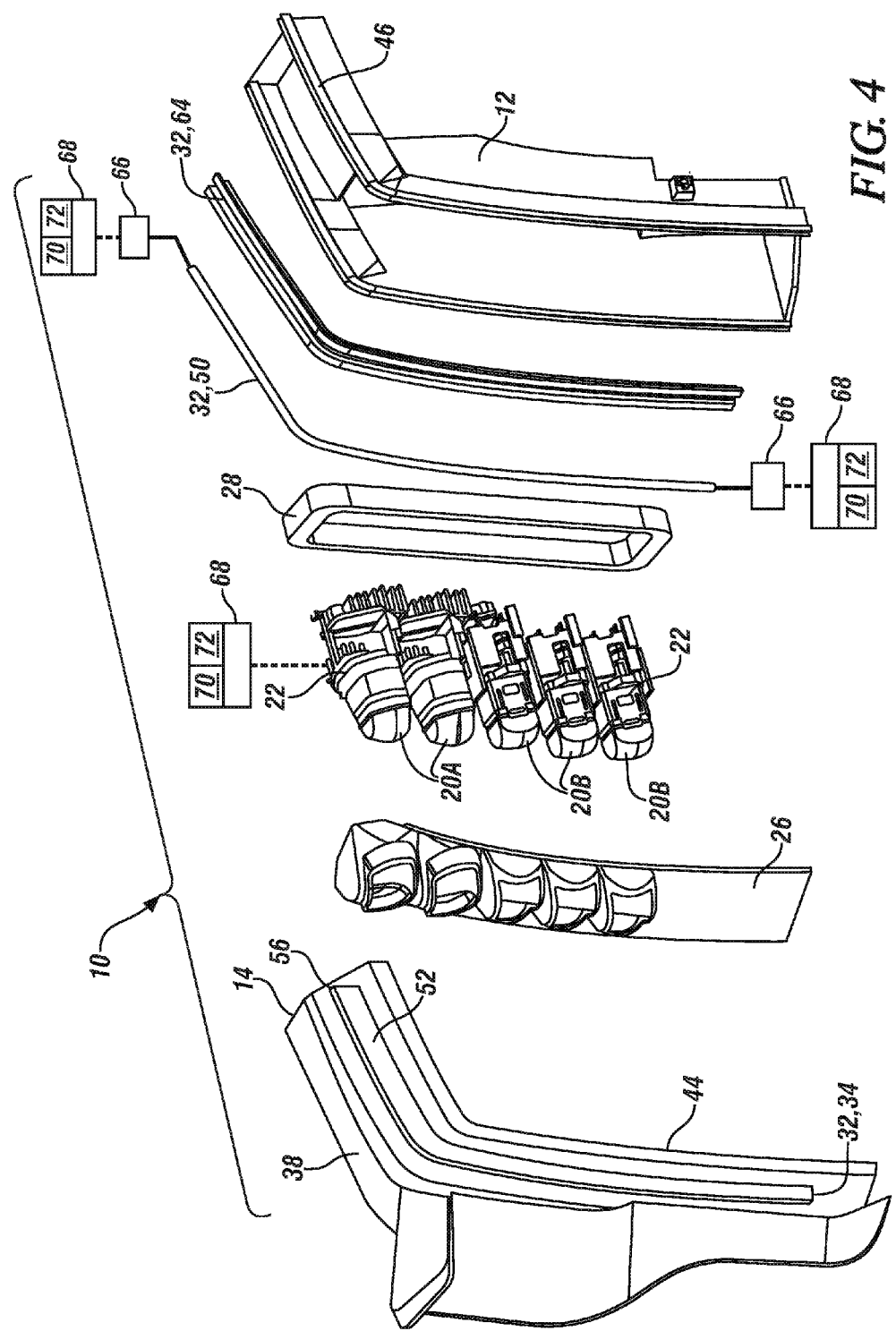
FIG. 4 is a schematic perspective exploded view of the light assembly.

Referring to FIGS. 2-4, the light assembly 10 also includes a first light module 20 disposed in the interior region 18. The first light module 20 is selectively operable to emit light that is transmitted through the lens 14. As best shown in FIG. 3, the first light module 20 can include a casing 22 and a lamp 24 being supported by the casing 22. The first light module 20 can also include a bezel 26 surrounding the lamp 24 and covering at least part of the casing 22 from visibility through the lens 14. The bezel 26 can provide an aesthetically pleasing appearance of the first light module 20 through the lens 14.

Referring to FIGS. 3 and 4, the light assembly 10 can optionally include a first carrier 28 that supports the first light module 20. Generally, the first carrier 28 is secured to the housing 12 and the first light module 20 is secured to the first carrier 28. Therefore, the first light module 20 and the first carrier 28 are stationary relative to the housing 12. The first light module 20 can be secured to the first carrier 28 in any suitable location and the first carrier 28 can be secured to the housing 12 in any suitable location. Furthermore, the first carrier 28 can be secured to the housing 12 and the first light module 20 in any suitable manner.

The first light module 20 is operable to emit light when desired and does not operate to emit light when desired. For example, the first light module 20 can be operated during the night or dusk to emit light. During the day, it can be desirable to turn the first light module 20 off such that the first light module 20 does not emit light. However, the first light module 20 can be operated during the day if desired.

In certain embodiments, the first light module 20 can include a plurality of first light modules 20 each attached to the first carrier 28 and stacked generally in a row (see FIGS. 1, 2 and 4) relative to each other along the first carrier 28. Therefore, the first light modules 20 are each supported by the first carrier 28. The first light module(s) 20 can be attached to the first carrier 28 in any suitable manner.

The first light modules 20 can be split into separate groups that operate for high beams or low beams. Therefore, one or more first light modules 20 can operate when high beams are desired, and one or more first light modules 20 can operate when low beams are desired. For illustrative purposes only, two of the first light modules 20 are low beam light modules 20A and the other three of the first light modules 20 are high beam light modules 20B. Each of the first light modules 20 (including the low beam light modules 20A and the high beam light modules 20B shown in the Figures) is attached to the first carrier 28, and is operable to selectively emit light. The high and low beam light modules 20A, 20B are organized in a row along the first carrier 28. It is to be appreciated that any suitable number of first light modules 20 can be utilized, and the Figures are illustrative of one example.

The first light modules 20, including both the low beam light modules 20A and the high beam light modules 20B are referred to generally by the reference numeral, whereas the low beam light modules 20A are referred to specifically with the reference numeral 20A, and the high beam light modules 20B are referred to specifically by the reference numeral 20B.

The lamp 24 of the first light module(s) 20 can include a light emitting diode 30 (LED). Therefore, for example, each of the low beam light modules 20A and the high beam light modules 20B can include the LED 30. It is to be appreciated that the first light module(s) 20, which includes low beam light modules 20A and the high beam light modules 20B, can include other types of light producing modules instead of LEDs 30.

Turning to FIGS. 3 and 4, the light assembly 10 also includes a second light module 32 selectively operable to emit light that is transmitted through the lens 14. The second light module 32 is operable to emit light when desired and does not operate to emit light when desired. For example, the second light module 32 can be operated during the day to emit light. During the night or dusk, it can be desirable to turn the second light module 32 off such that the second light module 32 does not emit light. However, the second light module 32 can be operated during dusk or night if desired.

As best shown in FIG. 3, at least a portion of the second light module 32 is integrated into the lens 14. By integrating the portion of the second light module 32 into the lens 14, a space savings in the interior region 18 occurs. In other words, integrating the portion of the second light module 32 into the lens 14 maximizes packaging space in the interior region 18. Furthermore, a reduction in fasteners, tooling costs and/or assembly time can occur by integrating the portion of the second light module 32 into the lens 14. The portion of the second light module 32 that is integrated into the lens 14 can be referred to as a light guide.

For example, the portion of the second light module 32 that is integrated into the lens 14 can include a first portion 34 (see FIG. 3) extending outwardly from the lens 14 away from the interior region 18 such that the first portion 34 is disposed outside of the interior region 18. As another example, the portion of the second light module 32 that is integrated into the lens 14 can further include a second portion 36 (see FIG. 3) extending outwardly from the lens 14 away from the first portion 34 such that the second portion 36 is disposed inside of the interior region 18. Therefore, the second light module 32 can include the first and second portions 34, 36, and thus, the first and second portions 34, 36 can be integrated into the lens 14. Furthermore, the first and second portions 34, 36 of the second light module 32 are configured to transmit light therethrough. The first and second portions 34, 36 can be referred to as the light guide.

In certain embodiments, the portion of the second light module 32 that is integrated into the lens 14 can be integrally formed with the lens 14. More specifically, the first and second portions 34, 36 can be integrally formed with the lens 14. Therefore, simply stated, the lens 14 and the first and second portions 34, 36 can be formed as one piece or a unit. As such, the lens 14, with the first and second portions 34, 36 can be molded together to form the one piece. One non-limiting example is that the lens 14 and the first and second portions 34, 36 can be injection molded. It is to be appreciated that other methods can be utilized to integrate the portion of the second light module 32 into the lens 14.

Furthermore, the portion of the second light module 32 that is integrated into the lens 14 can be formed of the same material(s) as the lens 14. Therefore, the first and second portions 34, 36 can be manufactured from transparent material(s), such as but not limited to, a polycarbonate material.

Continuing with FIG. 3, the lens 14 can include a first surface 38 facing away from the first light module 20 and a second surface 40 facing toward the first light module 20. In certain embodiments, the first portion 34 of the second light module 32 can extend outwardly from the first surface 38 away from the second surface 40. Furthermore, the second portion 36 of the second light module 32 can extend outwardly from the second surface 40 away from the first portion 34.

Continuing with FIG. 3, the lens 14 and the housing 12 can be secured to each other at an attachment segment 42. The lens 14 can include a distal edge 44, and the housing 12 can include a distal edge 46. In certain embodiments, the distal edge 44 of the lens 14 and the distal edge 46 of the housing 12 are secured to each other. The lens 14 and the housing 12 can be secured to each other by any suitable method(s) or feature(s). For example, a component 48 can secure the lens 14 and the housing 12 together at the attachment segment 42. The component 48 can be any suitable configuration to secure the lens 14 and the housing 12 together at the distal edges 44, 46. Non-limiting examples of the component 48 can include adhesive, fasteners, couplers, snaps, friction fit, tabs, clips, welded or soldered material(s), etc.

Referring to FIGS. 3 and 4, the second light module 32 can include a light pipe 50 selectively operable to transmit light through the portion of the second light module 32 that is integrated into the lens 14. Specifically, the light pipe 50 can be selectively operable to transmit light through the first and second portions 34, 36. Therefore, the light pipe 50 can be manufactured from transparent material(s) to allow light to transmit therethrough. The light pipe 50 can be disposed inside the interior region 18, and can also be disposed adjacent to the second portion 36. In certain embodiments, the light pipe 50 can be coupled to the second portion 36. Generally, the light pipe 50 is spaced from the first portion 34 of the second light module 32.

Turning to FIG. 3, the first portion 34 can include a first side 52, a second side 54 and a third side 56 interconnecting the first and second sides 52, 54. In certain embodiments, the light pipe 50 faces toward the third side 56 in a spaced relationship. For example, the first and second sides 52, 54 of the first portion 34 can extend from the first surface 38 of the lens 14, and the third side 56 of the first portion 34 is spaced from the first and second surfaces 38, 40 of the lens 14.

Continuing with FIG. 3, the second portion 36 can include a first side 58, a second side 60 and a third side 62 interconnecting the first and second sides 58, 60. In certain embodiments, the light pipe 50 faces the third side 62 of the second portion 36. For example, the first and second sides 58, 60 of the second portion 36 can extend from the second surface 40 of the lens 14, and the third side 62 of the second portion 36 is spaced from the first and second surfaces 38, 40 of the lens 14. In certain embodiments, the light pipe 50 is disposed closer to the third side 62 of the second portion 36 than the first and second sides 58, 60 of the second portion 36. The light pipe 50 can abut the third side 62 of the second portion 36 or be spaced from the third side 62 of the second portion 36.

Referring to FIGS. 3 and 4, the second light module 32 can include a carrier 64, referred to herein as a second carrier 64, with the light pipe 50 disposed between the second carrier 64 and the second portion 36. In certain embodiments, the light pipe 50 engages the second carrier 64 to secure the position of the light pipe 50 relative to the first and second portions 34, 36.

The second carrier 64 can be secured to the housing 12 and the first light module 20 such that the housing 12 and the first light module 20 support the second carrier 64. More specifically, the second carrier 64 can be attached to the housing 12 at the attachment segment 42. In certain embodiments, the second carrier 64 is attached to the housing 12 adjacent to the distal edge 46 of the housing 12. Furthermore, in certain embodiments, the second carrier 64 is attached to the bezel 26 and the housing 12. The second carrier 64 can be attached to the bezel 26 and the housing 12 by any suitable method(s) or feature(s), and non-limiting examples can include adhesive, fasteners, welding, soldering, couplers, snaps, friction fit, tabs, clips, etc.

Referring to FIG. 4, the second light module 32 can include a light emitting diode 66 (LED) that cooperates with the light pipe 50. The LED 66 can emit light to the light pipe 50 which, in turn, transmits the light to the first and second portions 34, 36. In certain embodiments, the LED 66 of the second light module 32 can include a plurality of LEDs 66 secured to the light pipe 50. For example, one LED 66 can be secured to one end of the light pipe 50 and another LED 66 can be secured to another end of the light pipe 50. The LEDs 66 of the second light module 32 can be disposed along the light pipe 50 in any suitable location, and FIG. 4 is one non-limiting example of the LEDs 66 being disposed along different ends of the light pipe 50. It is to be appreciated that the LEDs 66 can be disposed along one or more of a back side, a front side, a left side and a right side of the light pipe 50.

Furthermore, the LEDs 66 of the second light module 32 can be at least partially disposed inside the light pipe 50 or can be spaced from the inside of the light pipe 50. Therefore, the LEDs 66 of the second light module 32 can light the light pipe 50 from inside and/or outside of the light pipe 50. It is to be appreciated the second light module 32 can include other types of light producing modules instead of LEDs 66. It is also to be appreciated that one or more of the LEDs 66 of the second light module 32 can be secured to a support to provide a subassembly that can be secured to the light pipe 50 as a unit. Additionally, the support can include a plurality of supports, with one or more LEDs 30 of the second light module 32 secured to each of the supports.

Referring to FIG. 4, one or more controllers 68 can be utilized to control the first and second light modules 20, 32. As such, one or more controllers 68 can be utilized to selectively operate the first and second light modules 20, 32. Simply stated, one or more controllers 68 can be utilized to signal the first and/or second light modules 20, 32 to turn the LED(s) 30, 66, i.e., light, on and off. Therefore, for example, one controller 68 can control the first and second light modules 20, 32. As another example, one controller 68 can control the first light module 20 and another controller 68 can control the second light module 32. When utilizing a plurality of controllers 68, the controllers 68 can optionally communicate with each other.

The controller(s) 68 can include a processor 70 and a memory 72 on which is recorded instructions for controlling the first and second light module(s) 20, 32, and more specifically, the LEDs 30, 66. The controller(s) 68 can control other components 48 not specifically discussed herein and/or be in electrical communication with another controller(s) 68. The controller(s) 68 is configured to execute the instructions from the memory 72, via the processor 70. For example, the controller(s) 68 can be a host machine or distributed system, e.g., a computer such as a digital computer or microcomputer, and/or as a proportional-integral-derivative (PID) controller 68 device having the processor 70, and, as the memory 72, tangible, non-transitory computer-readable memory such as read-only memory (ROM) or flash memory. The controller(s) 68 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller(s) 68 can include all software, hardware, memory 72, algorithms, connections, sensors, etc., necessary to control the first and second light module(s) 20, 32, and specifically, the LEDs 30, 66 of the first and second light modules 20, 32. As such, a control method operative to control the first and second light module(s) 20, 32, and specifically the LEDs 30, 66, can be embodied as software or firmware associated with the controller(s) 68. It is to be appreciated that the controller(s) 68 can also include any device capable of analyzing data from various sensors, comparing data, making the necessary decisions required to control and monitor the first and second light module(s) 20, 32, and specifically, the LEDs 30, 66.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A light assembly comprising:
a housing;
a lens secured to the housing, wherein the lens cooperates with the housing to define an interior region therebetween;
a first light module disposed in the interior region and selectively operable to emit light that is transmitted through the lens; and
a second light module selectively operable to emit light that is transmitted through the lens;
wherein at least a portion of the second light module is integrated into the lens.

2. The assembly as set forth in claim 1 wherein the portion of the second light module that is integrated into the lens includes a first portion extending outwardly from the lens away from the interior region such that the first portion is disposed outside of the interior region.

3. The assembly as set forth in claim 2 wherein the portion of the second light module that is integrated into the lens further includes a second portion extending outwardly from the lens away from the first portion such that the second portion is disposed inside of the interior region.

4. The assembly as set forth in claim 3 wherein the first and second portions are integrally formed with the lens.

5. The assembly as set forth in claim 3 wherein the second light module includes a light pipe disposed adjacent to the second portion and inside the interior region, with the light pipe spaced from the first portion of the second light module, and wherein the light pipe is selectively operable to transmit light through the first and second portions.

6. The assembly as set forth in claim 5 wherein the second light module includes a carrier, with the light pipe disposed between the carrier and the second portion.

7. The assembly as set forth in claim 6 wherein the lens and the housing are secured to each other at an attachment segment, and wherein the carrier is attached to the housing at the attachment segment.

8. The assembly as set forth in claim 6 wherein the first light module includes a casing and a lamp being supported by the casing, and the first light module includes a bezel surrounding the lamp, and wherein the carrier is attached to the bezel and the housing.

9. The assembly as set forth in claim 1 wherein the lens includes a first surface facing away from the first light module and a second surface facing toward the first light module, and wherein the portion of the second light module that is integrated into the lens includes a first portion extending outwardly from the first surface away from the second surface.

10. The assembly as set forth in claim 9 wherein the portion of the second light module that is integrated into the lens includes a second portion extending outwardly from the second surface away from the first portion.

11. The assembly as set forth in claim 10 wherein the second light module includes a light pipe coupled to the second portion and disposed inside the interior region.

12. The assembly as set forth in claim 11 wherein the second light module includes a carrier, with the light pipe disposed between the carrier and the second portion.

13. The assembly as set forth in claim 12 wherein the lens includes a distal edge and the housing includes a distal edge, wherein the distal edge of the lens and the distal edge of the housing are secured to each other, and wherein the carrier is attached to the housing adjacent to the distal edge of the housing.

14. The assembly as set forth in claim 11 wherein the second portion includes a first side, a second side and a third side interconnecting the first and second sides, and wherein the light pipe faces the third side.

15. The assembly as set forth in claim 11 wherein the second light module includes a light emitting diode that cooperates with the light pipe.

16. The assembly as set forth in claim 1 wherein the portion of the second light module that is integrated into the lens is integrally formed with the lens.

17. The assembly as set forth in claim 1 wherein the second light module includes a carrier secured to the housing and the first light module such that the housing and the first light module support the carrier.

18. The assembly as set forth in claim 1 wherein the housing is configured for attachment to a structure of a vehicle.

19. A light assembly comprising:
a housing;
a lens secured to the housing, and the lens cooperates with the housing to define an interior region therebetween;
a first light module disposed in the interior region and selectively operable to emit light that is transmitted through the lens; and
a second light module selectively operable to emit light that is transmitted through the lens;
wherein the second light module includes a first portion integrated into the lens and configured to transmit light therethrough, with the first portion extending outwardly from the lens away from the interior region such that the first portion is disposed outside of the interior region;
wherein the second light module includes a second portion integrated into the lens and configured to transmit light therethrough, with the second portion extending outwardly from the lens away from the first portion such that the second portion is disposed inside of the interior region.

20. The assembly as set forth in claim 19 wherein the second portion includes a first side, a second side and a third side interconnecting the first and second sides, and wherein the second light module includes a light pipe disposed adjacent to the second portion and inside the interior region, with the light pipe facing the third side and spaced from the first portion of the second light module, and wherein the light pipe is selectively operable to transmit light through the first and second portions.

* * * * *